(12) United States Patent
Walter et al.

(10) Patent No.: US 6,600,408 B1
(45) Date of Patent: Jul. 29, 2003

(54) SOUND TRANSMISSION DEVICE FOR A MOTOR VEHICLE

(75) Inventors: Norbert Walter, Ludwigshafen (DE); Manfred Helget, Stuttgart (DE); Thomas Gokeler, Stuttgart (DE); Reinhard Hoffmann, München (DE); Udo Lindner, Karlsfeld (DE)

(73) Assignees: Mahle Filtersysteme GmbH, Stuttgart (DE); Bayerische Motorenwerke Aktiengesellschaft, Munich (DE)

( * ) Notice: Subject to any disclaimer, the term of this patent is extended or adjusted under 35 U.S.C. 154(b) by 0 days.

(21) Appl. No.: 09/980,610

(22) PCT Filed: Jan. 27, 2000

(86) PCT No.: PCT/DE00/00258

§ 371 (c)(1),
(2), (4) Date: Nov. 2, 2001

(87) PCT Pub. No.: WO00/69680

PCT Pub. Date: Nov. 23, 2000

(30) Foreign Application Priority Data

May 14, 1999 (DE) .......................... 199 22 216

(51) Int. Cl.[7] .................................. G08B 3/00
(52) U.S. Cl. ...................... 340/384.1; 123/184.21; 123/184.57
(58) Field of Search .................. 340/384.1, 438, 340/439; 123/184.53, 184.57, 184.21

(56) References Cited

U.S. PATENT DOCUMENTS 5,161,492 A * 11/1992 Hitomi et al. ......... 123/184.57
5,595,150 A * 1/1997 Horlacher .............. 123/184.57
5,839,405 A * 11/1998 Falkowski et al. ...... 123/184.57

FOREIGN PATENT DOCUMENTS

| DE | 180849 | 6/1904 |
|----|--------|--------|
| DE | 42 33 252 | 12/1993 |
| DE | 44 35 296 | 4/1996 |
| DE | 196 43 030 | 4/1998 |
| DE | 197 46 523 | 5/1998 |
| DE | 197 47 271 | 4/1999 |
| FR | 642 008 | 8/1928 |

* cited by examiner

*Primary Examiner*—Daryl Pope
(74) *Attorney, Agent, or Firm*—Collard & Roe, P.C.

(57) ABSTRACT

A device for the targeted transmission of sound from an induction tract of an internal combustion engine in a motor vehicle into the interior of the motor vehicle, comprising a hollow transmission body which communicates with the induction tract on the intake side and which emits sound on the output side into the vehicle interior. In order to improve the sound emission of a device of this type, the invention proposes that the transmission body had a conduit section with a conduit cross-section and a chamber section with a chamber cross-section, whereby the chamber cross-section is larger than the conduit cross-section. The conduit section communicates with the induction tract on the intake side and opens into the intake side of the chamber section. The output side of the chamber section emits the sound into the vehicle interior.

13 Claims, 1 Drawing Sheet

SOUND TRANSMISSION DEVICE FOR A MOTOR VEHICLE

CROSS REFERENCE TO RELATED APPLICATIONS

Figure 1:
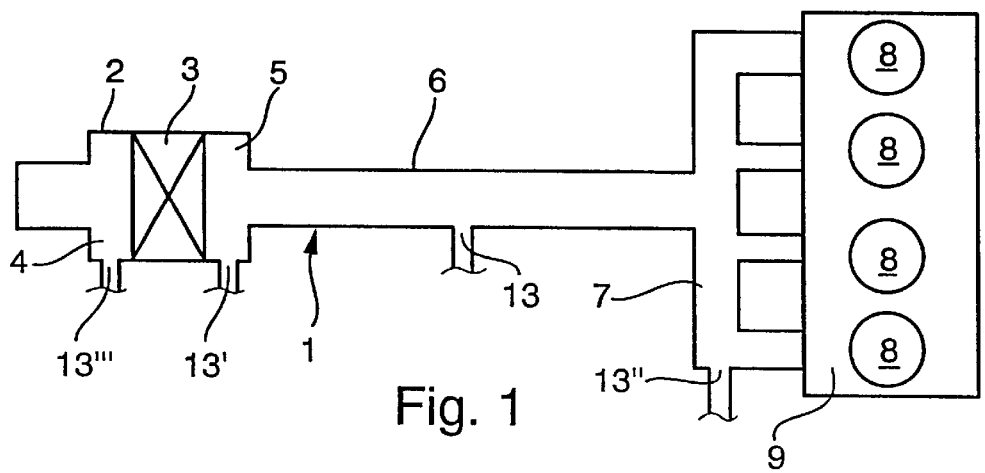

Applicants claim priority under 35 U.S.C. §119 of GERMAN Application No. 199 22 216.9 filed on May 14, 1999. Applicants also claim priority under 35 U.S.C. §120 of PCT/DE00/00258 filed on Jan. 27, 2000. The international application under PCT article 21(2) was not published in English.

The invention relates to a device for controlled transmission of sound from an intake tract of an internal combustion engine to an interior of the vehicle having the features of the definition of the species of the main claim.

German Patent 42 33 252 C1 describes such a sound transmission device where a hollow transmitting body formed by a tube communicates at the input end with the intake tract of the internal combustion engine. At the output end, the sound transmitting body, which is designed as a tube, has a diaphragm which, with the known sound transmission device, makes it possible for the sound transmitting body to radiate sound at the output end to the interior of the vehicle. The sound radiating power that can be achieved with such a sound transmission device is relatively low, so it is necessary for the transmission end of the tub having the diaphragm at the output end to pass through a front transverse wall or end wall or spray wall of the vehicle, separating the interior of the vehicle from an engine space containing the internal combustion engine. The transmission tube can thus radiate sound directly through the diaphragm and into the interior of the vehicle to achieve the desired noise effect in the interior of the vehicle. It is thus relatively complicated to assemble the known sound transmission device in a vehicle.

The present invention is concerned with the problem of providing an embodiment having an improved sound radiating power for a sound transmission device of the type defined in the preamble.

This problem is achieved according to this invention by a sound transmission device having the features of claim 1.

This invention is based on the general idea of designing a resonator which has a resonant effect in a desired frequency or frequency band due to a significant increase in cross section within the path of the sound in the sound transmitting body. Due to this resonance, sound energy from the intake tract can be absorbed within the desired frequency range and sent through the resonator to the interior of the vehicle. The sound radiating power of the sound transmission device is thus improved.

According to a preferred embodiment, a line section of the sound transmitting body is designed as a $\gamma/2$ resonator, where the output end of this line section is sealed with a diaphragm. Two resonators are connected in series in this way, increasing the acoustic power that can be withdrawn from the intake track and radiated toward the interior of the vehicle. However, a design with such a $\gamma/2$ resonator is a disadvantage when relatively low frequencies must be radiated especially intensely. In a sporty vehicle, for example, acoustic feedback in the range of approximately 250 Hz is perceived as especially attractive by the driver of the vehicle. The length of the $\gamma/2$ resonator must then be approximately 1.20 meters at a sound velocity of approximately 300 m/s. Therefore, it is relatively complicated to accommodate a line section designed as a $\gamma/2$ resonator in the engine compartment, because there is usually very little available space in the engine compartment.

A significant improvement is obtained with an alternative refinement wherein a chamber section of the sound transmitting body has a diaphragm bordering in the chamber section a first chamber communicating with the line section. These features make it possible to design the resonator as a so-called "Helmholtz resonator." With such a Helmholtz resonator, the air volume enclosed in the first chamber functions acoustically as a "spring" while the line section functions acoustically as a "mass" which couples the first chamber to the sound field of the intake tract. This yields an oscillating spring-mass resonance system which resonates especially strongly with sound excitation in the range of the resonant frequency, thus making it possible to pull an especially high radiant energy from the sound field and radiate it through the resonator and into the interior of the vehicle. An especially advantageous embodiment of this invention is obtained when the line section is relatively short, so that the volume of the line section is much smaller than the volume of the first chamber. The resonant properties of the Helmholtz resonator are improved by this measure.

The embodiment of the resonator designed with an enlarged cross section as a Helmholtz resonator results in such a great increase in power that as a rule, a cutout through the front wall of the vehicle and the assembly costs associated with this are unnecessary.

It is especially advantageous if the diaphragm forms an airtight seal on the output end of the sound transmitting body, so that it is possible to connect the sound transmitting body to the input end of the intake tract on the clean end. The input end of the sound transmitting body and/or the line section is preferably connected to the clean end of an air filter of the intake tract or to an air collector from which intake air is distributed to the individual cylinders of the internal combustion engine, or it is connected to a connecting line which connects the air filter to the air collector.

To improve the sound radiation of a certain frequency or frequency band, the chamber section may have at its output end a tube section having a smaller cross section than the cross section of the chamber, where the diaphragm in the chamber section borders a second chamber communicating with the tube section. The resulting resonance system is influenced by this measure, so higher frequency vibrations can be absorbed. The transmission ratio of the resonance system can be adjusted by a suitable choice of the volume of the first chamber relative to the volume of the second chamber. Measures for damping of the resonance system may consist, for example of providing a baffle having a baffle cross section in the tube section, for example, where the baffle cross section is smaller than the tube cross section. The damping of the resonance system can be influenced through the choice of the baffle cross section. In addition, the tube section may be designed at its outlet as a widening funnel, so that an improvement in the sound radiating power is also achieved here. The transmission properties of the resonance system can also be influenced through a controlled choice of the diaphragm, e.g., with regard to weight, size, shape and/or rigidity.

Other important features and advantages of the sound transmission device according to this invention are derived from the subordinate claims, the drawings and the respective description of figures on the basis of the drawings.

It is self-evident that the features mentioned above and to be explained further below can not only be used in the combination indicated here but also in any other combinations or by themselves without going beyond the scope of the present invention.

Preferred embodiments of this invention are illustrated in the drawings and are explained in greater detail in the following description.

Figure 2:
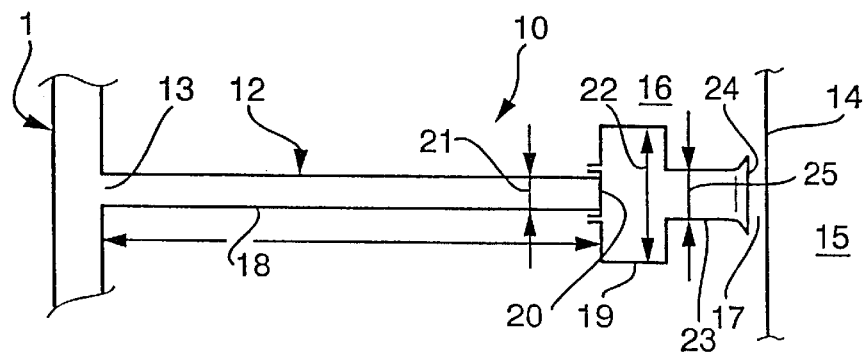
Figure 3:
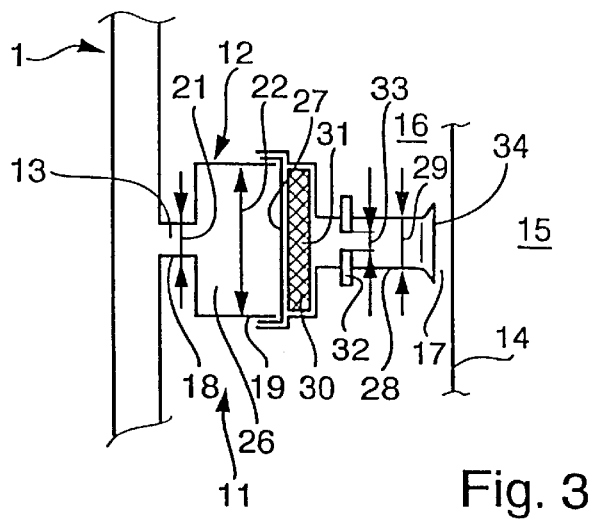

The figures show schematically:

FIG. 1: a schematic diagram of an intake tract of an internal combustion engine, FIG. 2: a schematic diagram of a first embodiment of a sound transmission device according to this invention, and FIG. 3: a schematic diagram of a second embodiment of the sound transmission device according to this invention.

According to FIG. 1, an air intake tract 1 of an internal combustion engine 9 has an air filter 2 in which a filter element 3 separates a tube end 4 from a clean end 5. A connecting line 6, which may be formed by a tube, for example, connects the air filter 2 to an air collector 7 which distributes the fresh air taken in to individual cylinders 8 of the internal combustion engine 9. Within this air intake tract 1, a sound field is formed during operation of the internal combustion engine 9, its sound or noise characteristic correlating with the power delivered by the internal combustion engine 9, in particular its rotational speed. To provide occupants of the vehicle, the driver in particular, with acoustic feedback of operation of the internal combustion engine, the vehicle (not shown, but it is a passenger car in particular, preferably a sports car) has a sound transmission device 10 (embodiment according to FIG. 2) or 11 (embodiment according to FIG. 3) as illustrated in FIGS. 2 and 3.

According to FIGS. 2 and 3, such a sound transmission device 10, 11 has a sound transmitting body 12 communicating with the intake tract 1 at the input end at 13.

According to FIG. 1, the sound transmission device 10, 11 is connected at its input end 13 preferably to the connecting line 6 of the intake tract 1. Likewise, there are possible embodiments wherein the input end 13' is connected to the clean end 5 of the air filter 2. With many types of vehicles, it may be advantageous to connect the input end 13" to the air collector 7. With another embodiment, the input end 13'" may be connected to the raw end 4 of the air filter 2. In the embodiments where the sound transmission device 10, 11 communicates with the clean end of the air intake tract 1, it is important for the sound transmission device 10, 11 to be designed airtight with respect to the outside.

According to FIGS. 2 and 3, the air intake device 10, 11 ends at an output end labeled as 17 directly before a partition 14, which separates a vehicle interior 15 from an engine compartment 16 containing the internal combustion engine 9 in the vehicle. Likewise, the output end 17 can be arranged so close to this partition 14, which is also known as a "front wall" or a "splash wall," that the output end 17 is in contact with and/or attached to the partition 14. It is also possible for the output end 17 of the sound transmission device 10 or 11 to form a passage through the partition 14 to improve the sound radiating power into the vehicle interior 15. In another embodiment, the partition 14 may also be formed by a housing (not shown) of a fresh air filter through which an air conditioning system in the vehicle draws fresh air into the vehicle interior 15. To this extent, the sound penetrating through this partition 14 can easily enter the vehicle interior 15.

The sound transmitting body 12 consists of a line section 18 and a chamber section 19. The line section 18 communicates with the intake tract 1 at the input end and with an input of the chamber section 19 at the output end. One output of the chamber section 19 forms the output end 17 of the sound transmission device 10, 11.

The line section 18 has a line cross section 21, while the chamber section 19 has a chamber cross section 22. As shown clearly in FIGS. 2 and 3, the chamber cross section 22 is designed to be much larger than the line cross section 21. Due to this measure, the chamber section 19 acts as a resonator which in its resonance range derives more vibrational energy from the line section 18 and at its output 17 makes this vibrational energy available for radiation into the vehicle interior 15.

According to FIG. 2, the line section 18 in a first embodiment is sealed by a diaphragm 20 in the area of its mouth into the chamber section 19. If the air transmitting device 10 is connected to the clean end of the intake tract 1, this diaphragm 20 is mounted airtight to prevent an inadmissible supply of uncleaned air to the internal combustion engine 9. According to FIG. 2, the line section 18 is designed as a so-called "γ/2 resonator" where the length of line section 18 between its ends corresponds to approximately γ/2 (see dimension line in FIG. 2). It does not matter here whether the line section 18 is linear or curved as in FIG. 2. Accordingly, the line section 18 may be formed by a relatively rigid pipe or a relatively flexible tube; γ here is the wavelength of a preferred frequency or the average wavelength of a preferred frequency range which is to be radiated into the vehicle interior 15.

The sound radiated by the γ/2 resonator over diaphragm 20 into the resonator formed in the chamber section 19 is transmitted over a relatively broad band in the latter resonator and is emitted by the sound transmitting body 12 through a tube section 23 at the outlet of the chamber section 19. At the outlet of the tube section there is a sound outlet 24 which becomes wider toward the outside and is shaped like a funnel or a tulip shape. The tube section 23 has a tube cross section 25 which is smaller than the chamber cross section 22.

According to FIG. 3, in the preferred variant of the sound transmission device 11 according to this invention, the line section 18 is designed to be relatively short, so that the air volume in it is much smaller than the air volume in a first chamber 26 which is formed by a diaphragm 27 in the chamber section 19. The diaphragm 27 here preferably also causes an airtight closure of the sound transmitting body 12. Due to this embodiment, the resonator is designed as a Helmholtz resonator, where the air volume in the line section 18 functions as a "mass" and the air volume in the chamber 26 functions as a "spring." The resulting "spring-mass oscillator" has a certain calculable resonance behavior. The resonant frequency of this Helmholtz resonator is influenced by this diaphragm 27, which forms one elastic wall of the first chamber 26, while on the other hand the sound energy in the frequency range of the resonance in the resonance range is withdrawn from the resonator, relayed further and radiated toward the vehicle interior 15 at the output end 17.

Various measures are possible for influencing the sound characteristic radiated from the output end 17, and they can be used as alternatives or cumulatively. These measures each produce damping of the sound radiated by the diaphragm 27 and can therefore be interpreted as "damping elements" of the aforementioned spring-mass oscillator.

According to the embodiment illustrated in FIG. 3, the chamber section 19 has a tube section 28 with a tube cross section 29 which is much smaller than the chamber cross section 22. In this way, the diaphragm 27 in the chamber section 19 separates a second chamber 30 from the first chamber 26 which communicates with the tube section 28. The damping effect of diaphragm 27 can be influenced through the choice of the relationship between the volumes of the two chambers 26 and 30. A damping body 31, which may be made of an open-pored foam, for example, is introduced into the second chamber 30. It is likewise possible to accommodate such a damping material in the tube section 28 or in the first chamber 26 or in the line section 18.

A baffle 32 whose baffle cross section 33 is smaller than the tube cross section 29 is mounted in the tube section 28. By adjusting the baffle cross section 33, the acoustic response of the resonance system can also be varied. Finally, a sound output 34 here is also designed as a funnel or a tulip shape to influence the sound radiation in the desired manner.

Although the diaphragm 27 in FIG. 3 is made of a flexible material, especially a rubber elastic material and is secured on the chamber section 19 at the periphery, the diaphragm 27 may also be made of a relatively rigid material, in which case then the clamping or fastening of this diaphragm on the chamber section 19 is also elastic accordingly. The choice of diaphragm material, its shape and mounting are similar to those of a diaphragm in a loudspeaker.

According to a preferred embodiment, the line section 18 is designed to be cylindrical, at least in the area connected to the chamber section 19. Likewise, the chamber section 19 is preferably cylindrical in design. The following dimensions have proven suitable in practice: line cross section 21: approx. 20 cm$^2$, chamber cross section 22: approx. 45 cm$^2$, tube cross section 29: approx. 20 cm$^2$, baffle cross section 33: approx. 3 cm$^2$, length of the line section 18: approx. 8 cm, length of the first chamber 26: approx. 8.5 cm, length of the second chamber 30: approx. 5.4 cm, length of the tube section 28: approx. 11.2 cm, outside diameter of the sound outlet 34: approx. 7.5 cm.

The diaphragm is preferably made of an elastomer, e.g., NBR/PVC, which may be reinforced by a fabric made of nylon 6.6 in particular.

What is claimed is:

1. A device for controlled transmission of sound from an intake tract (1) of an internal combustion engine (9) of a motor vehicle to an interior (15) of the vehicle, with a hollow sound transmitting body (12) which communicates at the input end (13) with the intake tract (1) and at the output end (17) it radiates sound to the vehicle interior (15); characterized in that the sound transmitting body is designed airtight with respect to the outside;

the sound transmitting body has a line section (18) with a line cross section (21) and a chamber section (19) with a chamber cross section (22);

the chamber cross section (21) is larger than the line cross section (22);

the line section (18) communicates at the input end with the intake tract (1) and at the output end it opens into the input end of the chamber section (19) and the output end of the chamber section (19) radiates sound toward the vehicle interior (15).

2. A sound transmission device according to claim 1, characterized in that the line section (18) is designed as a γ/2 resonator or has a section designed as a γ/2 resonator, where one end, preferably the output end of this γ/2 resonator is sealed with a diaphragm (20).

3. A sound transmission device according to claim 1, characterized in that the chamber section (19) has a diaphragm (27) bordering a first chamber (26) which communicates with the line section (13) in the chamber section (19).

4. A sound transmission device according to claim 3, characterized in that the line section (18) is designed to be relatively short, so that the volume of the line section (18) is much smaller than the volume of the first chamber (26).

5. A sound transmission device according to claim 1, characterized in that the chamber cross section (22) is 1.5 to 4 times larger than the line cross section (21) of an adjacent area of the line section (18).

6. A sound transmission device according to claim 1, characterized in that the chamber section (18) has a tube section (23; 28) on its output end whose tube cross section (25; 29) is smaller than the chamber cross section C22).

7. A sound transmission device according to claim 6, characterized in that the tube section (23; 28) is shaped as a widening funnel at its outlet (24; 34).

8. A sound transmission device according to claim 3, characterized in that the diaphragm (27) in the chamber section (19) borders a second chamber (30) which communicates with the tube section (28).

9. A sound transmission device according to claim 6, characterized in that a baffle (32) with a baffle cross section (33) is arranged in the tube section (28), where the baffle cross section (33) is smaller than the tube cross section (29).

10. A sound transmission device according to claim 1, characterized in that damping elements are arranged in the line section (18) and/or in the chamber section (19) and/or in the first chamber (26) and/or in the second chamber (30) and/or in the tube section (28).

11. A sound transmission device according to claim 3, characterized in that the diaphragm (27) is made of a rubber elastic material and is attached at its periphery to the chamber section (19).

12. A sound transmission device according to claim 3, characterized in that the diaphragm is made of a relatively stiff material and is secured to the chamber section (19) at its periphery in an elastic manner.

13. A sound transmission device according to claim 1, characterized in that the sound transmitting body (12) is connected at the input end to a clean end of the intake tract (1), and the sound transmitting body (12) is sealed airtight toward the outside.

* * * * *